US011548359B2

(12) United States Patent
Facchinello et al.

(10) Patent No.: US 11,548,359 B2
(45) Date of Patent: Jan. 10, 2023

(54) RETRACTABLE HARD PANEL TONNEAU COVER

(71) Applicant: Tectum Holdings, Inc., Ann Arbor, MI (US)

(72) Inventors: Jerome Facchinello, Grand Blanc, MI (US); Chad A. Carter, Manchester, MI (US); Robert Mosingo, Saline, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 0 days.

(21) Appl. No.: 17/370,102

(22) Filed: Jul. 8, 2021

(65) Prior Publication Data

US 2022/0032749 A1    Feb. 3, 2022

Related U.S. Application Data

(60) Provisional application No. 63/058,854, filed on Jul. 30, 2020.

(51) Int. Cl.
*B60J 7/14* (2006.01)
*B60J 7/19* (2006.01)
*B60J 7/04* (2006.01)

(52) U.S. Cl.
CPC ............. *B60J 7/141* (2013.01); *B60J 7/041* (2013.01); *B60J 7/198* (2013.01)

(58) Field of Classification Search
CPC ....................................................... B60J 7/141
USPC ......................................... 296/100.08, 100.09
See application file for complete search history.

(56) References Cited

U.S. PATENT DOCUMENTS

| 4,313,636 | A | * | 2/1982 | Deeds | B60J 7/141 |
| | | | | | 296/100.09 |
| 8,205,928 | B2 | | 6/2012 | Steffens et al. | |
| 8,960,765 | B2 | | 2/2015 | Facchinello et al. | |
| 9,004,571 | B1 | | 4/2015 | Bernardo et al. | |
| 9,211,834 | B2 | | 12/2015 | Facchinello et al. | |
| 9,597,995 | B1 | * | 3/2017 | Weltikol | B60J 7/141 |
| 9,738,143 | B2 | | 8/2017 | Weltikol et al. | |
| 9,815,357 | B2 | * | 11/2017 | Hall | B60J 7/198 |
| 10,005,347 | B1 | * | 6/2018 | Singer | B60J 7/041 |
| 10,328,780 | B2 | * | 6/2019 | DeLong | B60J 7/198 |
| 10,414,258 | B2 | * | 9/2019 | Singer | B60J 7/08 |
| 11,279,212 | B2 | * | 3/2022 | Wang | B60P 7/02 |
| 11,299,021 | B2 | * | 4/2022 | Dylewski, II | B60J 7/1607 |
| 2015/0197290 | A1 | * | 7/2015 | Chapman | B60J 7/1607 |
| | | | | | 296/100.08 |
| 2020/0384837 | A1 | * | 12/2020 | Singer | B60R 9/058 |

* cited by examiner

*Primary Examiner* — Jason S Morrow
(74) *Attorney, Agent, or Firm* — The Dobrusin Law Firm, P.C.

(57) ABSTRACT

A tonneau cover that includes a first panel and a second panel. The first panel is arranged rearward of the second panel in vehicle position when the tonneau cover is in a first position, each of the first panel and the second panel comprise a top surface and an opposing bottom surface. The first panel and the second panel are movable into a second position where the bottom surface of the first panel is juxtaposed with the bottom surface of the second panel.

20 Claims, 10 Drawing Sheets

RETRACTABLE HARD PANEL TONNEAU COVER

PRIORITY

This application claims the benefit of U.S. 63/058,854 filed on Jul. 30, 2020, the entire contents of which is expressly incorporated by reference herein for all purposes.

FIELD

These teachings relate to a cover for a vehicle, and more particularly to a tonneau cover with retractable hard panels.

BACKGROUND

Some vehicles, like pick-up trucks, have an open-topped bed or cargo area that may be used for storing or transporting cargo. A cover, such as a tonneau cover, may be placed over the cargo area. The cover may be opened to access the cargo and/or the inside of the cargo area and closed to conceal the cargo from view and/or to prevent fluid and/or debris from entering the cargo area.

Some covers include one or more panels that can be moved or repositioned to access the cargo and/or the inside of the cargo area. Some of these panels are heavy and large, which can make them unwieldy and difficult to move. Some of these panels may also be moved or stacked against the forward end of the cargo area, which may reduce the amount of the space available in the cargo area for storing and/or transporting cargo. Accordingly, it may be desirable to have a cover that overcomes at least some of the aforementioned limitations.

For example, it may be desirable to have a tonneau cover with hard or rigid panels that are enabled to fold between open and closed positions. It may be desirable to have a tonneau cover with plural hard panels that can be stowed near a forward section of the cargo area. It may be a desirable to have a tonneau cover with mechanisms that can be actuated to fold and unfold the panels between the open and closed positions.

SUMMARY

These teachings provide a cover for a vehicle. The cover may be a tonneau cover. The cover may include one or more panels. The one or more panels may be hard or rigid. However, the panels may be soft or flexible (i.e., a flexible skin or sheet of material that is supported by one or more frame or supports). The panels may be slats. A slat may be a panel that is semi-rigid or semi-soft or flexible. The one or more panels may be connected together via one or more hinges. The one or more panels may be actuated and moved into an open and closed position. The one or more panels may be moved manually and/or automatically into the open and closed positions. The one or more panels may be stowed at a forward section of the cargo area (i.e., adjacent a passenger area of the vehicle). In some configurations, the one or more panels may be stowed at a rearward section of the cargo area (i.e., adjacent a tailgate), or adjacent to a side wall of the cargo area.

In the second position, the first panel is on top of the second panel and the second panel is on top of the third panel. In the second position, the first panel, the second panel, and the third panel are arranged in a stack. The top surface of the first panel, the top surface of the second panel and/or the top surface of the third panel are arranged generally horizontally in the second position. The third panel is connected to a mechanism to assist with moving the third panel, the second panel, and/or the first panel from the generally horizontal position to a generally vertical configuration. In the generally vertical configuration, the first panel, the second panel, and the third panel are stowed within a storage compartment.

A tonneau cover comprising a first panel and a second panel, the first panel is arranged rearward of the second panel in vehicle position when the tonneau cover is in a closed position, each of the first panel and the second panel comprise a top surface and an opposing bottom surface. The first panel and the second panel are movable into a stack where the bottom surface of the first panel is juxtaposed with the bottom surface of the second panel. The tonneau cover comprises a third panel, the second panel is arranged between the first panel and the third panel when the tonneau cover is in the closed position. In the stack, the second panel is arranged in between the first panel and the third panel. In the stack, the top surface of the second panel is arranged adjacent to the top surface of the third panel. In the stack, the first panel is on top of the second panel and the second panel is on top of the third panel. The third panel is connected to a mechanism to assist with moving the stack from the generally horizontal position to a generally vertical configuration. The third panel is connected to a mechanism to assist with moving the stack into a storage compartment. In the storage compartment, the first panel, the second panel, and the third panel are in a generally vertical position. The tonneau cover comprises a fourth panel that is arranged forward of the first, second, and third panels. The fourth panel is connected to a mechanism to assist moving the fourth panel into a storage compartment. The fourth panel is moved into the storage compartment before the stack is moved into the storage compartment. The fourth panel is arranged generally vertically inside the storage compartment. The tonneau cover comprises a fifth panel that is arranged forward of the first, second, third, and fourth panels, the fifth panel is pivotable between an open and closed position.

A method of moving a tonneau cover from a closed position to an open position, the method comprising: moving a first panel about a first hinge onto a second panel such that a bottom surface of the first panel is juxtaposed with a bottom surface of the second panel. The first panel is a rear-most panel of the tonneau cover. The method comprises a step of moving the first panel and the second panel on to a third panel. The method comprises a step of moving the first panel and the second panel on to the third panel such that the first panel, the second panel, and the third panel are arranged in a stack. The method comprises a step of pivoting a fourth panel into a storage compartment. The method comprises moving the stack into the storage compartment. The fourth panel is moved into the storage compartment before the stack is moved into the storage compartment. The method comprises moving a fifth panel into an open position to open the storage compartment and then moving the fifth panel into a closed position to close the storage compartment.

DETAILED DESCRIPTION

These teachings provide a cover. The cover may be an apparatus, system, or assembly for at least partially covering at least a portion of a vehicle, such as a cargo area.

The cover may be attached, placed, supported, connected, or enabled to rest on one or more top surfaces of the one or more walls defining a cargo area. The cover may be attached, placed, supported, connected, or enabled to rest on one or more rails or supports that are attached or connected to one or more top and/or side surfaces of one or more walls defining the cargo area. The cover or one or more top surfaces of the cover or panels thereof may be generally flush with one or more top surfaces of the one or more side walls defining the cargo area, or may be raised or lowered relative to the top surfaces of the one or more side walls defining the cargo area.

The cover or one or more components of the cover (e.g., the one or more panels, hinges, frames, mechanisms, etc.) may be an aftermarket product that is/are attached to a vehicle by a vehicle owner or at the direction of a vehicle owner. The cover or one or more components of the cover may be assembled, installed, and/or integrated into the vehicle or cargo area by an OEM (Original Equipment Manufacturer).

The vehicle may be any vehicle. The vehicle preferably has a cargo area or bed. The cargo area may be any area or portion of a vehicle that may be used for storing and/or transporting goods or cargo. The cargo area may be any part of the vehicle that has an open top. The cargo area or open top can be at least partially closed or covered by a cover.

The cargo area may be a cargo box, bed, trunk, storage compartment, or a combination thereof. The cargo area may be located in a front portion of a vehicle, a middle portion of a vehicle, and/or at a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by another vehicle. The cargo area may be part of a pickup truck. The cargo area may be part of a utility task vehicle or utility terrain vehicle (UTV). In some configurations, the cargo area may have another cover or top on it, and the cover according to these teachings may be provided between the floor of the cargo area and the cover or top. For example, the cover according to these teachings may be provided inside of a vehicle or sport utility vehicle (SUV) to close or cover or conceal contends in the hatch, trunk, or other region of the vehicle. The cover may be a tonneau cover. The cover may have one or more panels.

One or more of the features or elements of the cover disclosed and/or illustrated herein may be provided or combined with any suitable cover, even though the combination or integration is not illustrated or expressly disclosed herein. Moreover, one or more elements or features of the cover or panel disclosed herein may be moved or repositioned into other areas or features of the cover without departing from the spirt of this application. One or more features or elements of the cover disclosed and/or illustrated herein may be duplicated. One or more features or elements of the cover disclosed and/or illustrated herein may be removed or eliminated. One or more features or elements of the cover disclosed and/or illustrated herein may be rearranged into other areas or positions of the cover depending on various construction of the vehicle and/or cargo area. For example, a non-limiting example of this is that one or more panels that are part of the first panel group 30 may instead be in the second panel group 32. For example, panel 26c may be moved from the first panel group 30 to the second panel group 32. Another non-limiting example is that the panel 26d can be moved from the second panel group 32 to the first panel group 30, and, accordingly, may be part of the stack 40 with the other panels of the first panel group 30. Moreover, while the mechanisms 34, 36 are illustrated as attached to panels 26c and 26d, respectively, the mechanisms 34, 36 can be attached to one or more of the other panels, for example panels 26b and/or panel 26e. Alternatively, one or more of the mechanisms 34, 36 may be duplicated or partially or entirely eliminated.

The cover may be an apparatus, system, and/or assembly having one or more panels. A panel may be any of the one or more parts, portions, components, or sections of the cover that function to close or cover the cargo area. For example, a panel may be or may comprise hinge, spacer bar, and/or a panel described herein. A panel may be any part of the cover that is moveable or can be moved relative to another part, portion, component or section of the cover, a vehicle, a cargo area, or a combination thereof.

The one or more panels may be made of a suitable material, such as plastic, metal, foam, composite, wood, fiberglass, or a combination thereof. The one or more panels may be substantially rigid, at least partially soft, flexible, bendable, resilient, or a combination thereof. The one or more panels may comprise a core that is covered in a skin. The core may be a plastic material such as extruded polypropylene or foam. The skin may be a sheet or spray that covers the core. The skin may be TPU, TPV, TPE, and/or TPR. The one or more panels may be made of the same or similar material as the cargo area or fenders so that the cover and the cargo area and vehicle have a uniform, integrated appearance. The one or more panels may be made of a single material or may be formed of multiple materials or components that are assembled together. The one or more panels may be slats. The one or more panels may be rigid, flexible, bendable. The one or more panels may be generally planar. The one or more panels may have one or more contours, bends, or curves, which may follow a contour or profile of the cargo area or vehicle. The panels may be painted to match a color of the cargo area or vehicle. The panels may interlock with adjacent panels when in the flat closed position and/or in the open position.

The cover may include one or more spacer bars. A panel may be or may include a spacer bar. A spacer bar may be a material, component, assembly, structure, or member that is provided or located between or adjacent panels, hinges, or frames. A spacer bar may be provided between adjacent panels to separate the panels to provide required clearance between the panels to enable the panels to pivot or move relative to each other and/or to fold into a stack and/or into a stowed configuration in the storage compartment. A spacer bar may have a width that is generally smaller than a width of other panels (e.g., smaller than a width of panels 26a,b, c,d, and/or e). A spacer bar may have a width that is generally the same as or larger than a width of other panels (e.g., smaller than a width of panels 26a,b,c,d, and/or e). A spacer bar may be connected to adjacent panels and/or to a non-movable portion of the vehicle or cargo area via one or more hinges.

The cover may include one or more hinges. A panel may be or may include one or more hinges. A hinge may be a joint, turning point, juncture, axis, journal, pivot, or other feature about which one or more panels can move, pivot, swing, bend, fold, flex, displace, pivot, or otherwise change position relative to one or more other panels, the cargo box, the vehicle, or a combination thereof. A hinge may allow or provide for the one or more panels to be moved between the open and closed configuration, or into a position in between the open and closed configuration. A hinge may be provided between two adjacent panels, spacer bars, or both. A hinge may define or separate two adjacent panels. A hinge may be attached to both a fixed or spacer bar and a nonmoving portion of the vehicle or cargo bed to enable the panel to move relative to the non-moving part of the vehicle or cargo bed (e.g., a grounded portion).

A hinge may be or may include one or more brackets that rotate or pivot about one or more pins. A hinge may include one or more springs. A hinge may include one or more torsion springs to assist with movement of the one or more panels. A hinge may be or may include a living hinge between adjacent panels. A living hinge may be a cutout, detent, notch, groove, channel, thinned-area, flexible material, or a combination thereof formed or added to a panel. Two or more of such panels with one or more living hinges may be combined to define the cover. A hinge may be or may include an elastomeric or flexible material.

The cover may include one or more frames. The one or more panels may include one or more frames. The one or more frames may function to provide strength and rigidity to the one or more panels. A frame may prevent the cover and/or one or more panels from twisting, bending, folding, deforming, collapsing, sagging, or otherwise moving in unintended areas or directions. In some configurations, one or more of the panels may be free of a frame. This may be the case if the panel is made from a rigid material, such as a rigid injection molded or composite construction. The one or more frames may be made of a suitable material, such as plastic, metal, foam, composite, wood, fiberglass, or a combination thereof. The one or more panels may be substantially rigid.

The one or more frames may be provided around a perimeter of the one or more panels. The one or more frames may be located within a thickness of the one or more panels; may be attached to a top and/or bottom surface of the one or more panels; or a combination thereof. The one or more frames may be covered by a skin or over molded with a material to form the one or more panels. The one or more mechanisms and/or hinges may be attached to the one or more frames.

The cover and/or the one or more of the panels can be moved or repositioned relative to one another and/or relative to the cargo area or vehicle to move the cover or one or more panels thereof between a closed configuration and an open configuration and vice versa.

A closed configuration means that the cover or one or more panels are arranged to conceal at least partially, block, hide, restrict, or otherwise prevent sight, access, and/or entry to an inside of the cargo box. In the closed configuration, the one or more panels may be arranged to protect against dirt, debris, fluid, sunlight, and/or other contaminants or items from entering an inside of a cargo area.

In the closed configuration, one or more of the panels may be in a generally horizontal position (in vehicle position), and free from being stacked or folded on top of one or more other panels, cover surfaces, or the cargo area. However, in some configurations, a closed configuration may include one or more of the panels being in a non-horizontal position (such as a generally vertical position or at an angle relative to the cargo area).

The closed configuration may refer to one or more panels being in a closed configuration or to the entire cover assembly being in the closed configuration. In other words, one or more of the panels may be in the closed configuration (for example, a panel that is located near or adjacent to the passenger area, while another one or more panels (for example one that is located rearward in vehicle position of the closed panel, closer to the tailgate) is in the open configuration.

An open configuration means that the one or more panels are arranged to provide access or entry at least partially to or into the cargo area or an inside thereof. In the open configuration, one or more of the panels may be moved or repositioned from the closed configuration to provide sight and/or access to an inside of the cargo box.

In the open configuration, one or more of the panels may be in any non-horizontal position (in vehicle position). However, in some configurations, an open configuration may include one or more of the panels being in a horizontal position relative to the cargo area. In the open configurations, the one or more panels may be stacked or folded on top of one or more other panels, cover surfaces, or the cargo area.

The one or more panels may be stacked. Stacked means that one or more panels can be located on top of one or more other panels, cover surfaces, and/or vehicle features. Stacked means that one or more of the panels are juxtaposed with one or more other panels, cover surfaces, and/or vehicle features. Stacked means that one or more panel surfaces (i.e., top or bottom surfaces) are in contact with adjacent other panel surfaces, parallel to adjacent other panel surfaces, at an angle relative to other panels, or a combination thereof. The panels and/or surfaces thereof may be in direct contact with each other when the panels are stacked, or the surfaces may be spaced apart via spacers or by virtue of the spacer bars and/or hinges connecting the stacked panels. One or more panels in a stack may be sandwiched between other panels. For example, a center panel in a three-panel stack may be sandwiched between two panels (top and bottom), and the surfaces may or may not be in direct contact with each other.

The open configuration may refer to one or more panels being in an open configuration or to the entire cover assembly being in the open configuration. In other words, one of the panels may be in the closed configuration (for example, a panel that is located near or adjacent to the passenger area, while another panel (for example one that tis located rearward of the closed panel, closer to the tailgate) is in the open configuration.

An open configuration may be when the one or more panels are in a stowed position. A stowed position may be when one or more of the panels are located or moved into the storage area. The one or more panels may be hidden from view when located in the stowed position and/or in the storage area.

The one or more panels may be moved from a closed configuration to an open configuration and vice versa by moving, repositioning, or otherwise changing a position of one or more panels relative to one or more other panels, the cargo box, the vehicle, one or more hinges, or a combination thereof. For example, a position of one or more of the panels can be changed by moving, pivoting, folding, swinging, or otherwise turning or flipping one or more panels over or onto another one or more panels about one or more hinges, frames, panels, spacer bars elements, or a combination thereof. The one or more panels can be manually moved between the closed and open configurations. The one or more panels can be automatically moved between the closed and open configurations via one or more mechanisms.

The vehicle, the cargo area, the cover, or a combination thereof may include one or more storage areas. A storage area may be an area, region, compartment, and/or space that is configured to house or contain one or more panels of the cover. A storage area may be located at a forward end of the cargo area (i.e., against a front wall of the cargo area). A storage area may be located in the passenger area of the vehicle, where one or more passenger or vehicle occupants sit. A storage area may be located between the passenger area of the vehicle and the cargo box. A storage area may be located at the rear end of the cargo area adjacent the tailgate. A storage area may be located in a region of one or more of the side walls of the cargo area (i.e., passenger/driver side walls). A storage area may be located in a region of the floor or bottom of the cargo area.

The storage area may include one or more compartments, boxes, canisters, or other containers into which one or more of the panels may be located when the panels or cover is moved into the open or stowed position. The storage area may hold or maintain the panels to restrict or prevent movement of the panels therein. The panels may be stacked inside of the storage area. The panels may be folded and/or nested together inside the storage area. The panels may be hidden from view when inside of the storage area. That is, one or more walls, covers, and/or panels may conceal the one or more panels from view when located therein. The storage area and/or container may be removable from the cargo area for service purposes.

The cover and/or the one or more panels may include one or more mechanisms. The one or more mechanism may function to assist with moving and/or maintaining a position of the one or more panels during movement thereof. The one or more mechanisms may enable to cover and/or the one or more panels to be moved automatically (i.e., with little or no human force required) or manually (i.e., with some human intervention or manipulation). The one or more mechanisms may function to ensure the panels are moved along a predetermined path to prevent damage to the panels and/or cargo box. For example, the one or more mechanism may ensure the panels do not crash into one another or into the vehicle or cargo area during panel movement. The one or more mechanisms may function to reduce or prevent pinching of objects between the panels and/or hinges.

The one or more mechanisms may be connected to one or more of the panels, frames, hinges, spacer bars, or a combination thereof. The one or more mechanism may be connected to any portion or region of the cargo area (i.e., walls 16A and/or 16B; the front wall (18); the tailgate 20; the floor 22; and/or rails or brackets attached thereto) to ground the mechanisms and/or cover. The one or more mechanisms may be hidden from view, for example, located between the side walls and a bed liner.

The one or more mechanisms may include one or more motors, such as stepper or servo motors, actuators, linear actuators, shocks, springs, torsion bars, magnets, air and/or hydraulic cylinders, pumps, batteries, cams, links, levers, pulleys, or a combination thereof. The one or more mechanisms may include one or more cables, rods, bearings.

The one or more mechanisms may be electrically connected to one or more remotes, controllers, and/or devices to assist with automatically moving the cover between the positions illustrated and/or described herein. For example, the one or more mechanisms may be electrically connected or integrated with one or more features disclosed in U.S. 63/024,585 dated May 14, 2020 to move the cover and/or the one or more panels between the illustrated and/or described positions upon the detection of an event (such as rain or moisture detection, when a vehicle is put into a drive or park gear, when a key fob is detected (or no longer detected), etc.). The one or more mechanisms may also include one or more anti-pinch devices to restrict or prevent an object from being pinched or damaged, especially when being moved into the stowed configuration, which may undesirably damage the cover, the panels, and/or the pinched object.

Figure 1:
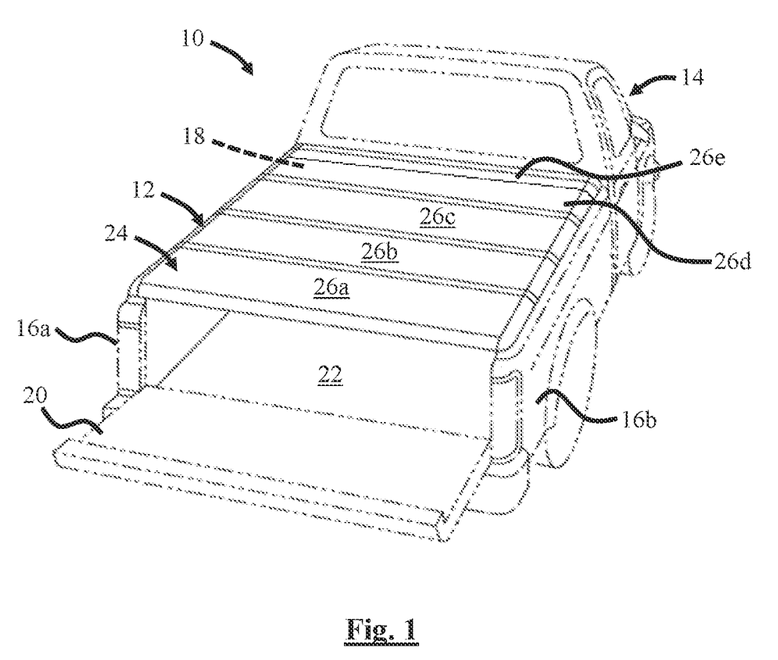
FIG. 1 is a perspective view of a vehicle and a tonneau cover.

A vehicle 10 is illustrated in FIG. 1. The vehicle 10 comprises a bed or cargo area 12 and a passenger cab 14. The cargo area 12 is defined by a plurality of walls that include: opposing side walls 16*a*, 16*b*, a front wall 18 located adjacent the passenger cab 14, and a rear wall or tailgate 20 that opposes the front wall 18. The front wall 18 of the cargo area 12 may be a shared or common wall with a wall of the passenger cab 14. Such vehicles may be a one piece or uni-body vehicle. In other vehicles, the front wall 18 may be a separate wall, segment, or portion of the vehicle from a rear wall of the passenger cab 14. The front wall 18 may also provide access to the passenger cab 14 via a pass through or fold down wall or door. The cargo area 12 has a bottom or floor 22 that is surrounded by the walls 16*a*, 16*b*, 18, 20. The bottom or floor 22 is opposite a top or open end of the cargo area 12.

A cover 24 may be located, installed, or applied on top of the top or open end of the cargo area 12. The cover 24 may include one or more panels. In FIG. 1, the cover 24 includes five panels 26*a*, 26*b*, 26*c*, 26*d*, and 26*e*. However, the cover 12 may include any number of panels. Each of the panels may be separated from one another by a respective hinge 28*a*, 28*b*, 28*c*, 28*d* (See FIG. 2) to allow the respective panels to move relative to each other, other panels, the cargo area 12, and/or the vehicle 10.

Figure 2:
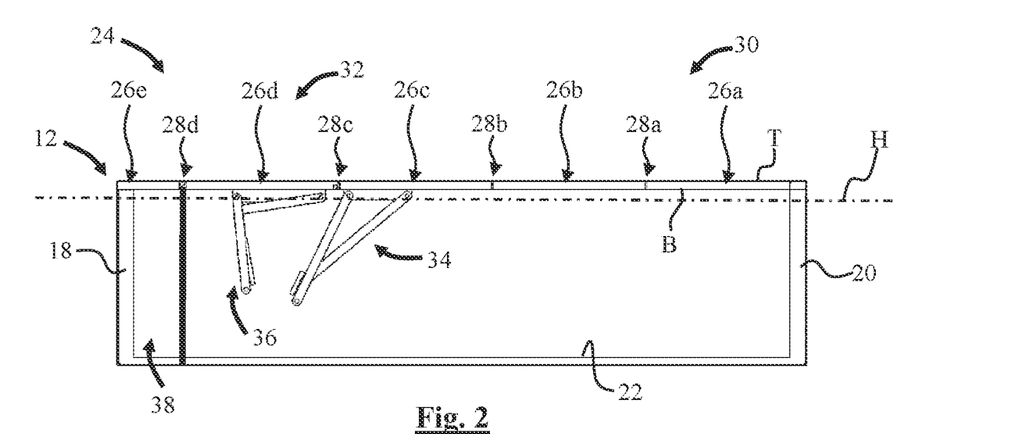
FIG. 2 is a side view of the tonneau cover.

FIG. 2 illustrates the cover 24 in a closed configuration. Each of the panels 26*a*, 26*b*, 26*c*, 26*d*, and 26*e* have a top surface T and an opposing bottom surface B.

For purposes of orientation in vehicle position, panel 26*a* may be referred to as the first or rear panel and is arranged adjacent to the tailgate 20. Panel 26*b* may be referred to as the second panel and is arranged between the first and third panels 26*a*, 26*c*. Panel 26*c* may be referred to as the third panel and is arranged between the second and fourth panels

26b, 26d. Panel 26d may be referred to as the fourth panel and is arranged between the third and fifth panels 26c, 26e. Panel 26e may be referred to as the fifth panel, a front panel, and/or a storage panel. One or more of the aforementioned panels may be removed or eliminated, which would thus correspondingly change the position and location of the rest of the panels. One or more additional panels may be added, which would thus correspondingly change the position and location of the rest of the panels.

In the illustrated closed configuration of FIG. 2, the panels 26a, 26b, 26c, 26d, and 26e are in a generally flat, planar, and/or horizontal position. The panels 26a, 26b, 26c, 26d, and 26e are arranged along a horizontal plane H. In the illustrated closed configuration, the top and bottom surfaces T, B of the panels 26a, 26b, 26c, 26d, and 26e are generally arranged in a common plane P. In the illustrated closed configuration, the top surfaces B of the panels 26a, 26b, 26c, 26d, and 26e all generally face the bottom or floor 22 of the cargo area 12.

The panels may be divided into panel groups, where a first panel group 30 includes panels 26a, 26b, and 26c. A second panel group 32 includes panel 26d. There may be any number of panel groups, and any number of panels in each group, including only one panel in a panel group.

The first panel group 30 includes one or more mechanisms or assemblies (i.e., a first mechanism 34) for moving one or more of the panels 26a, 26b, 26c in the first panel group 30. The first mechanism 34 is illustrated attached to the third panel 26c; however, the mechanism 34 may be attached to one or more of the other panels 26a, 26b in the group 30 as well, or instead. The mechanism 34 includes one or more elements that may be grounded, connected, or attached to one or both of the walls 16a, 16b of the cargo area 12, the floor of the cargo area 12, and/or the front wall 18 of the cargo area 12.

The second panel group 32 includes one or more mechanisms or assemblies (i.e., a second mechanism 36) for moving one or more of the panels 26d in the second panel group 32. The second panel group 32 is illustrated attached to the fourth panel 26d. The mechanism 36 includes one or more elements that may be grounded, connected, or attached to one or both of the walls 16a, 16b of the cargo area 12, the floor of the cargo area 12, and/or the front wall 18 of the cargo area 12.

The fifth panel, front panel, and/or storage panel 26e may cover a storage compartment 38. The storage compartment 38 may function to conceal or store one or more panels of the cover 24 when the cover 24 is in an open configuration, as will be discussed illustrated further below. As illustrated, the storage compartment 38 may be located within the cargo area 12 (i.e., between the front wall 18 and the tailgate 20); However, in other configurations, the storage compartment 38 may be located within the passenger area 14 or may be located in a region between the cargo area 12 and the passenger area 14.

FIGS. 3-24 illustrate movement of the panels of the tonneau cover 24. It is understood that the panels can be repositioned, folded, pivoted, rotated, or otherwise moved manually and/or with one or more mechanisms or assemblies. The one or more mechanisms and/or assemblies may include one or more motors, such as stepper or servo motors, actuators, linear actuators, shocks, springs, torsion bars, magnets, air and/or hydraulic cylinders, pumps, batteries, cams, links, levers, pulleys, cables, bars, etc. It is understood that some of the method steps of moving the panels of the tonneau cover 24 in the following FIGS. may be changed, omitted, duplicated, eliminated, etc. It is also understood that while the following figures depict movement and a method of moving the cover form a closed to open or stowed configuration, one having ordinarily skill would understand that movement of the cover or panels from the open or stowed position to the closed position can take place by reversing the method steps. Thus, in the interest of brevity, movement, or the method of moving the cover and/or panels from the open/stowed position to the closed position will not be described and/or illustrated.

FIGS. 3-8 illustrate movement of the cover 24 in a partially open position, where panels 26a, 26b of the first panel group 30 are in a non-flat, a non-planar, and/or a non-horizontal portion. More specifically, the first two panels 26a, 26b are moved out of the horizontal plane H about the first hinge 28a. The third panel 26c, fourth 26d, and/or fifth panels 26e of the second panel group may remain in the closed, horizontal portion. However, in some configurations, the third panel 26c, fourth 26d, and/or fifth panels 26e of the second panel group may be at least partially moved at this time to vent the cover and/or to make room for or during movement of the panels 26a, 26b.

Figure 8:
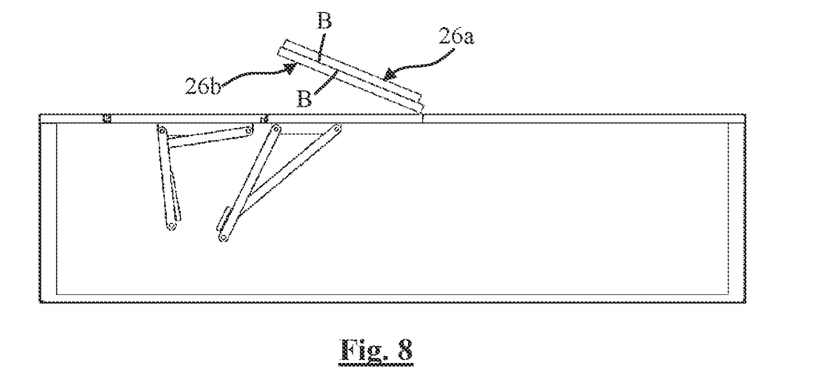
FIG. 8 is a side view of the tonneau cover.

Referring to FIG. 8, the panels 26a, 26b are moved such that a bottom surface B of the first panel 26a is juxtaposed, adjacent, or in contact with the bottom surface B of the second panel 26b. Juxtaposed as used herein means that the two panels 26a, 26b and/or surfaces may be arranged side by side, adjacent to one another, in close proximity to each other (but not touching—i.e., a gap between and/or standoffs in-between preventing the panels from directly touching), or in contact with one another.

Figure 9:
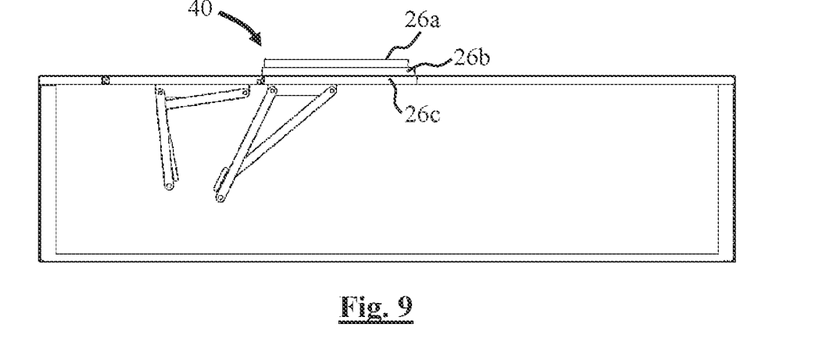
FIG. 9 is a side view of the tonneau cover.
Figure 9A:
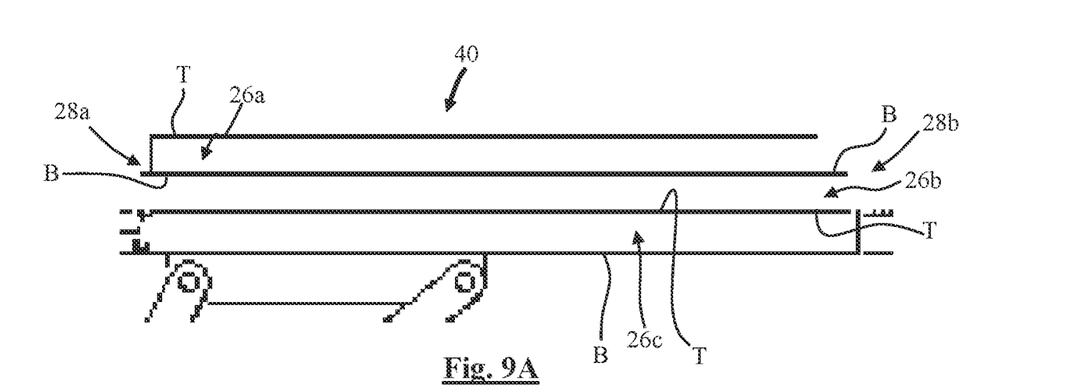
FIG. 9A is close up view of a portion of the tonneau cover of FIG. 9.

Referring now to FIGS. 9 and 9A, the panels 26a, 26b are moved on top of panel 26c to form a stack 40. In the stack 40, the second panel 26b is arranged between or juxtaposed with first and third panels 26a, 26c.

In the stack 40, the bottom surface B of the first panel 26a is juxtaposed with the bottom surface B of the second panel 26b.

In the stack 40, the top surface T of the second panel 26b is juxtaposed with the top surface T of the third panel 26c.

In the stack 40, in vehicle position, the first hinge 28a is located forward of the second hinge 28b. In other words, in the stack 40, the first hinge 28a is located closer to the passenger area 14 compared to the second hinge 28b and/or the second hinge 28b is located closer to the tailgate 20 than the first hinge 28a.

Figure 3:
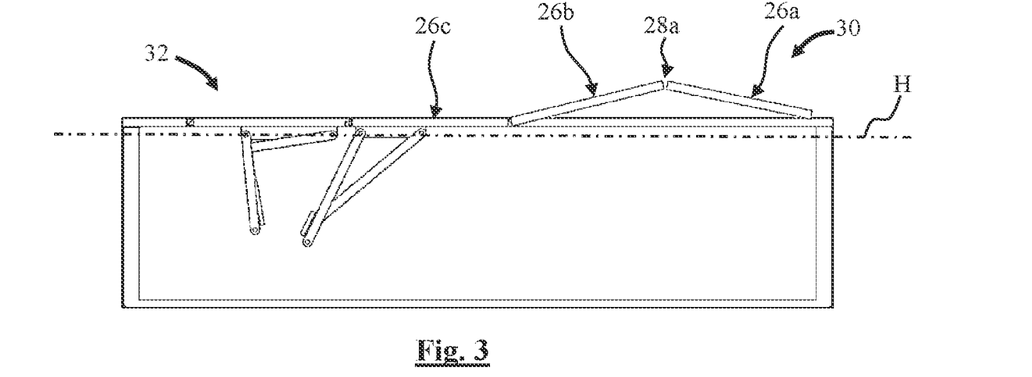
FIG. 3 is a side view of the tonneau cover.
Figure 4:
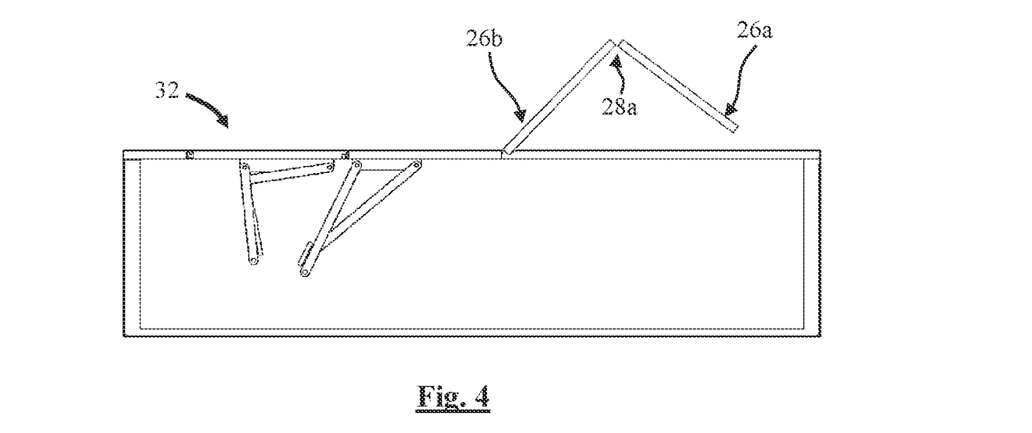
FIG. 4 is a side view of the tonneau cover.
Figure 5:
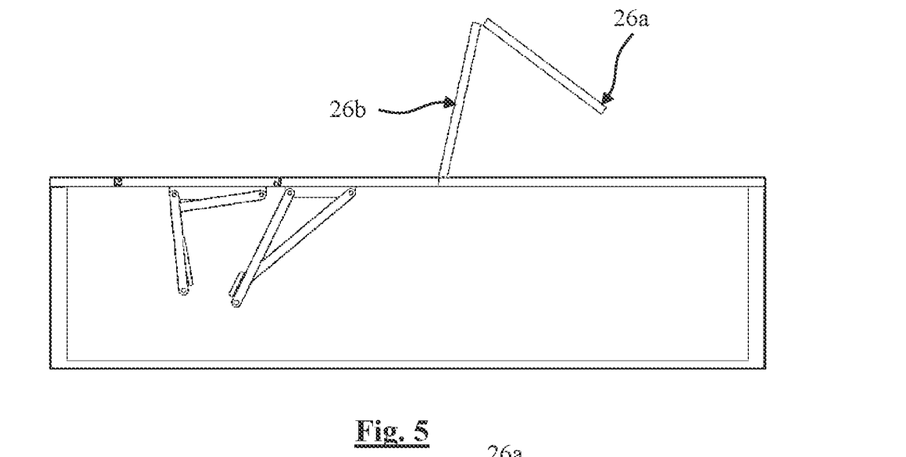
FIG. 5 is a side view of the tonneau cover.
Figure 6:
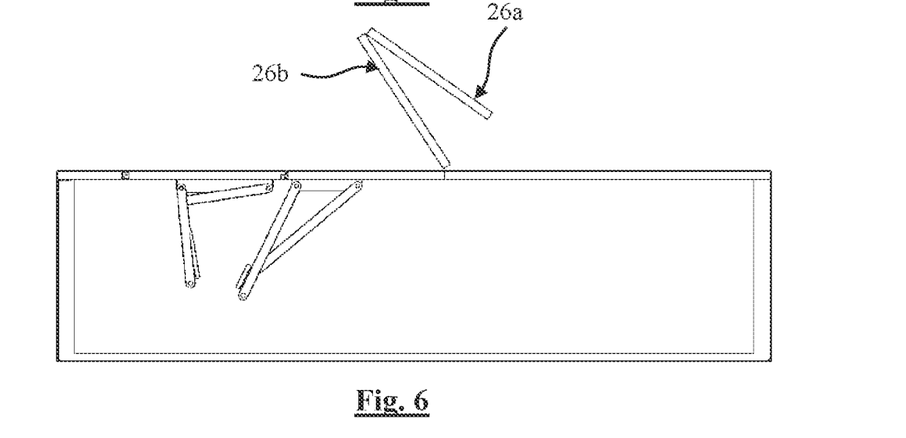
FIG. 6 is a side view of the tonneau cover.
Figure 7:
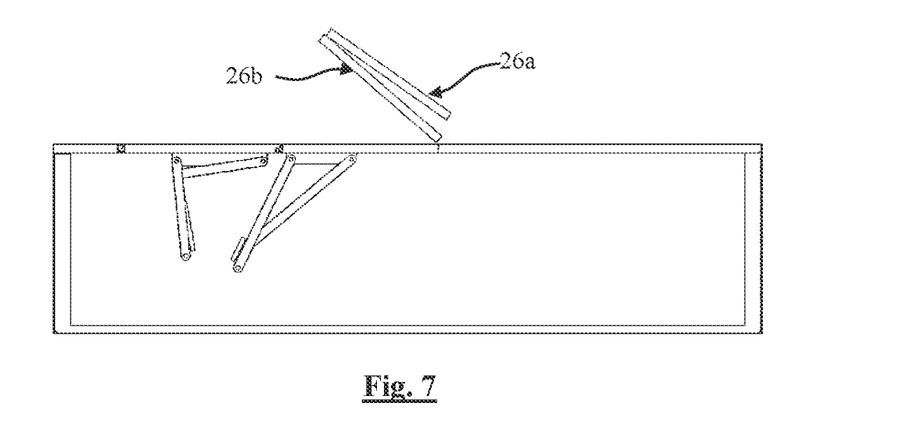
FIG. 7 is a side view of the tonneau cover.

In the stack 40, the top and bottom surfaces T, B of one or all of the panels 26a, 26b, 26c may be arranged in a generally horizontal position, relative to the plane H (FIG. 3). However, in some configurations, the surfaces T, B and/or panels 26a, 26b, 26c may be arranged at any angle relative to the plane H (FIG. 3) rather than being in a generally horizontal position when the panels are in the stack 40.

Figure 9B:
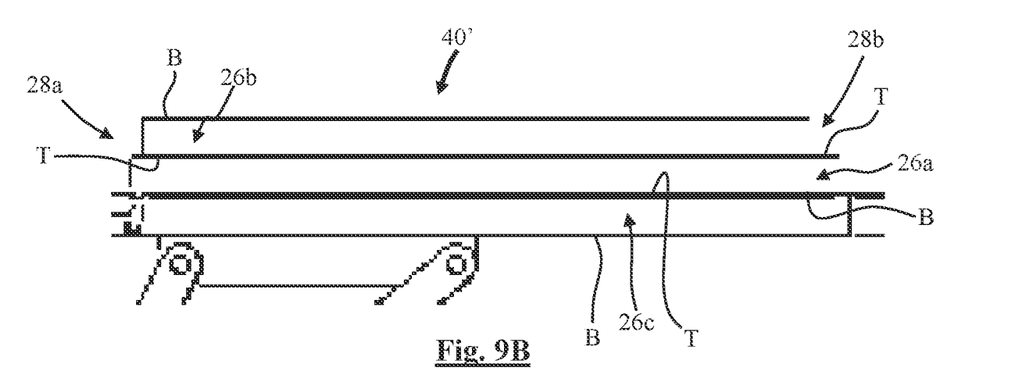
FIG. 9B is close up view of an alternative embodiment of the portion of the tonneau cover of FIG. 9.

FIG. 9B illustrates an alternate stack 40', where the panels 26a, 26b are moved on top of panel 26c to form the stack 40'. In the stack 40', the first panel 26a is arranged between or juxtaposed with second and third panels 26b, 26c. To form the stack 40', the first panel 26a is folded about hinge 28b onto the second panel 26b. The first and second panels 26a, 26b are then folded about hinge 28b onto the third panel 26c.

In the stack 40', the top surface T of the first panel 26a is juxtaposed with the top surface T of the second panel 26b.

In the stack 40', the top surface T of the third panel 26c is juxtaposed with the bottom surface B of the first panel 26a.

The stack 40' may then be moved into and out of the storage area 38 described further below, in the same manner stack 40 is moved.

Figure 10:
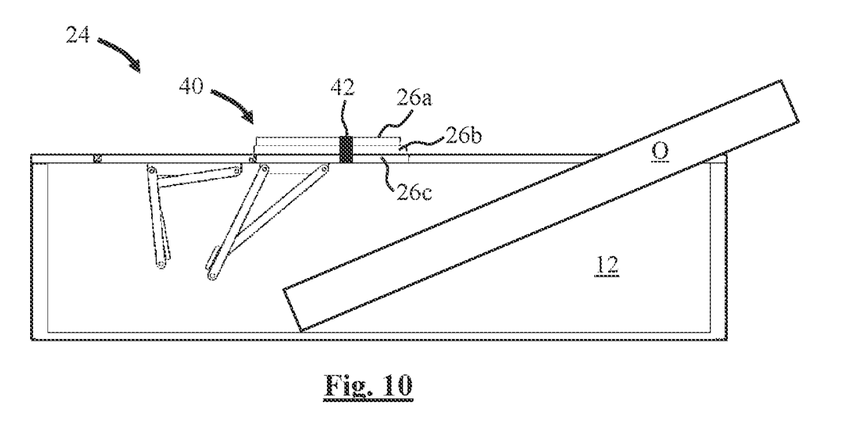
FIG. 10 is a side view of the tonneau cover.

In FIG. 10, the cover 24 is illustrated in a partially open configuration. One or more panels of the stack 40 can be held together via one or more straps, magnets, hook and loop fasteners, clamps, or other suitable closing/locking mechanisms 42 to prevent separation or movement of the panels 26a, 26b, 26c. This may allow the vehicle 10 to be driven without the panels 26a, 26b, 26c moving. When the cover 24 is in this at partially open configuration, an object O may be transported in the cargo area 12. The object O may be any object(s) such as lumber, furniture, a ladder, a surfboard, etc.

Figure 11:
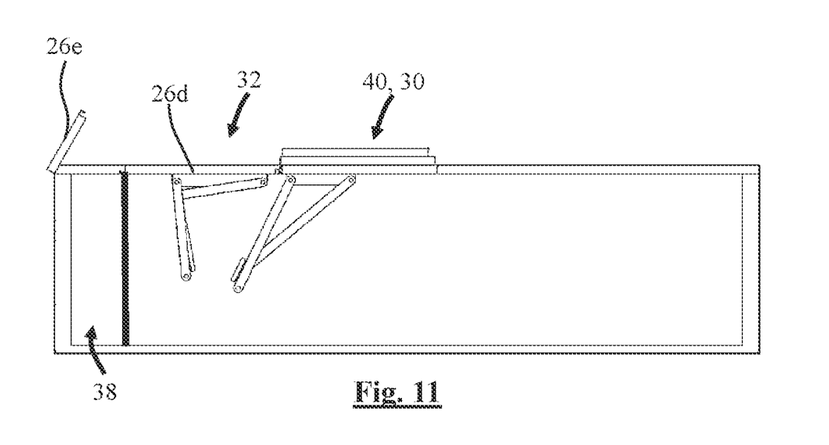
FIG. 11 is a side view of the tonneau cover.
Figure 12:
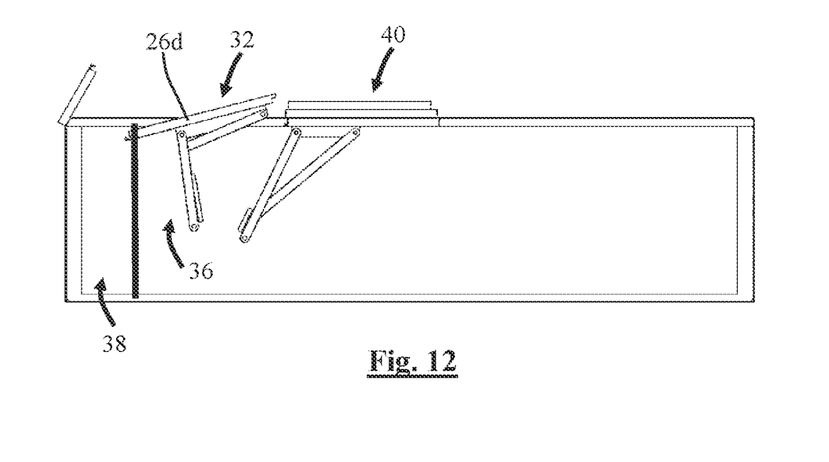
FIG. 12 is a side view of the tonneau cover.
Figure 13:
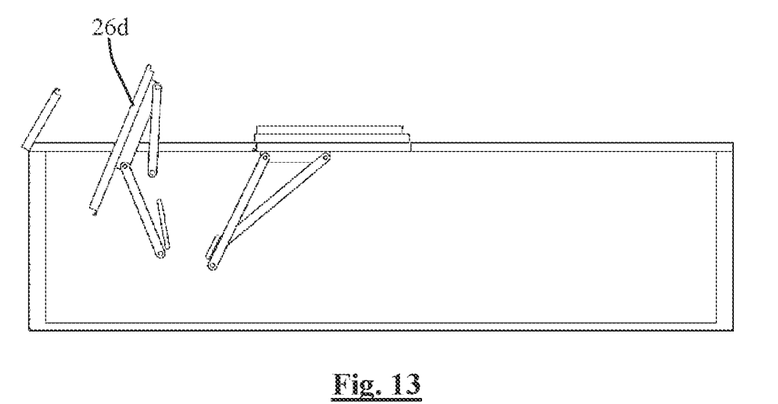
FIG. 13 is a side view of the tonneau cover.
Figure 14:
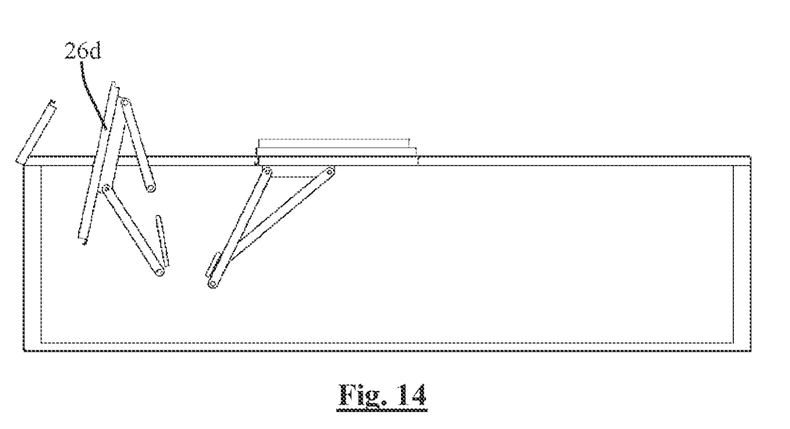
FIG. 14 is a side view of the tonneau cover.
Figure 15:
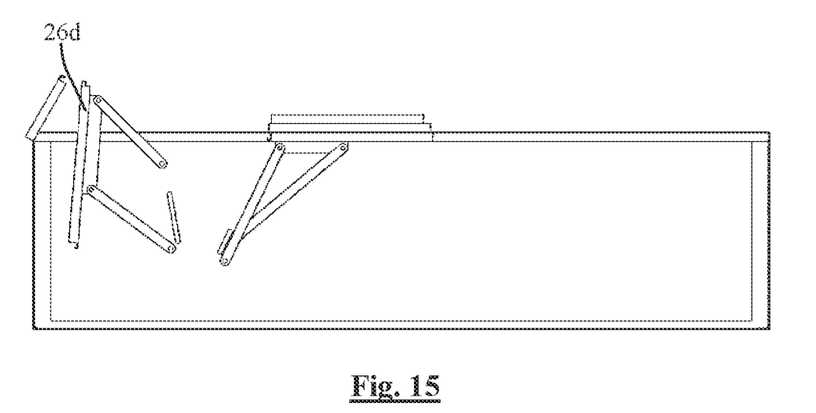
FIG. 15 is a side view of the tonneau cover.
Figure 16:
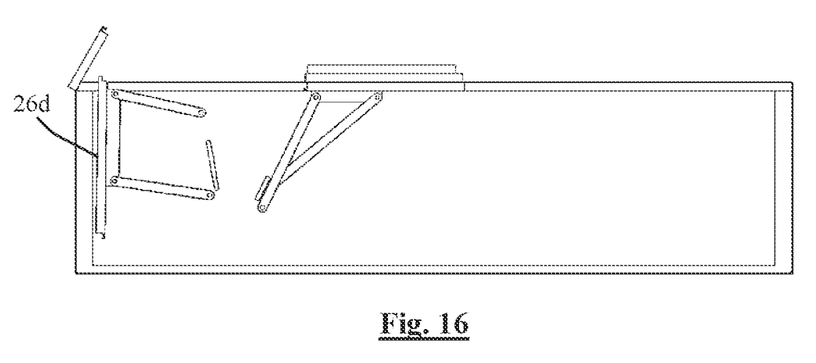
FIG. 16 is a side view of the tonneau cover.
Figure 17:
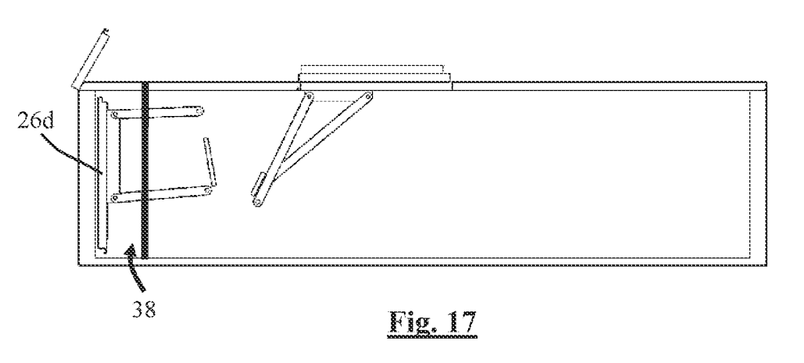
FIG. 17 is a side view of the tonneau cover.
Figure 18:
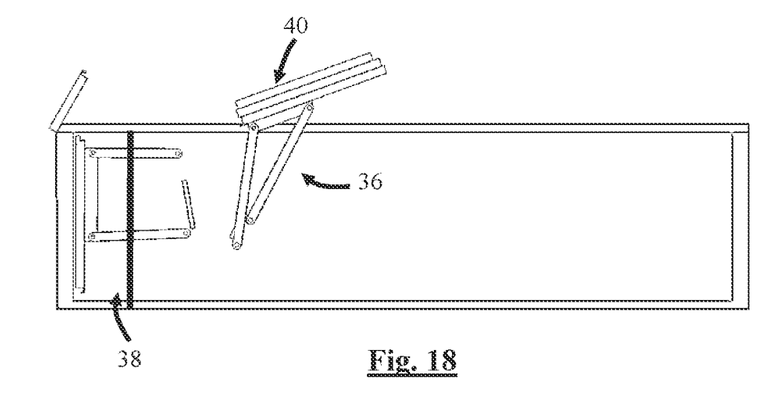
FIG. 18 is a side view of the tonneau cover.
Figure 19:
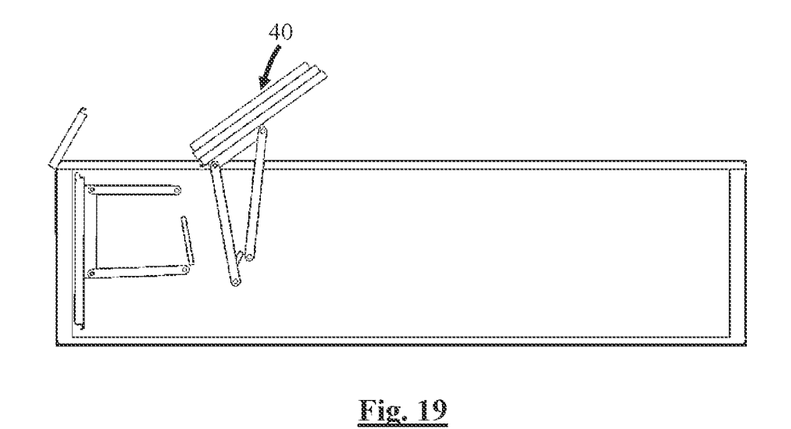
FIG. 19 is a side view of the tonneau cover.
Figure 20:
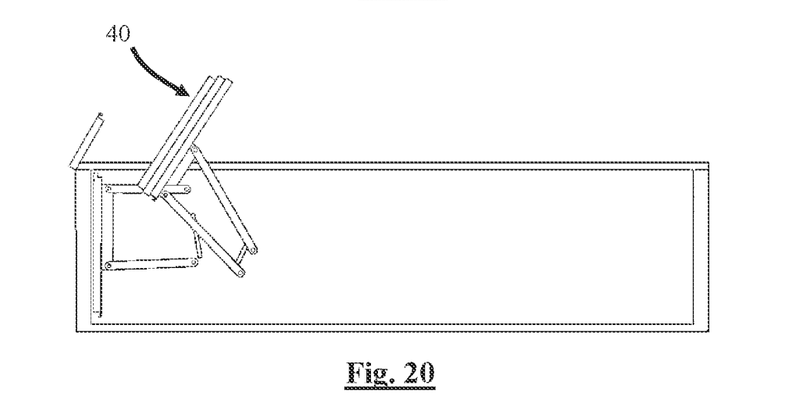
FIG. 20 is a side view of the tonneau cover.
Figure 21:
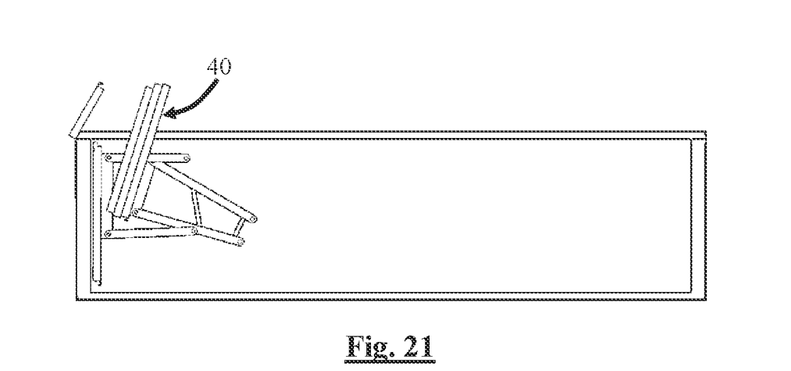
FIG. 21 is a side view of the tonneau cover.
Figure 22:
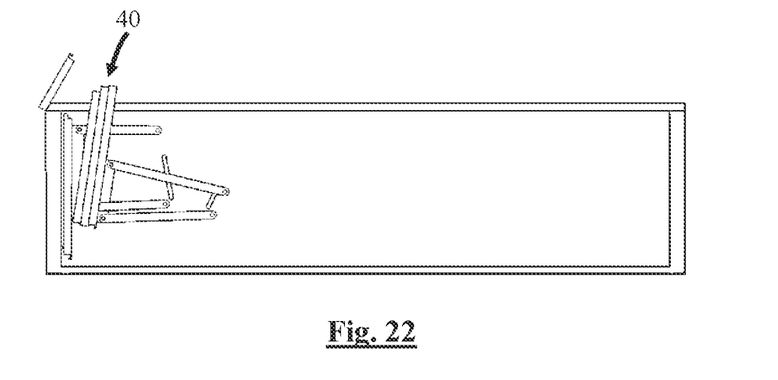
FIG. 22 is a side view of the tonneau cover.
Figure 23:
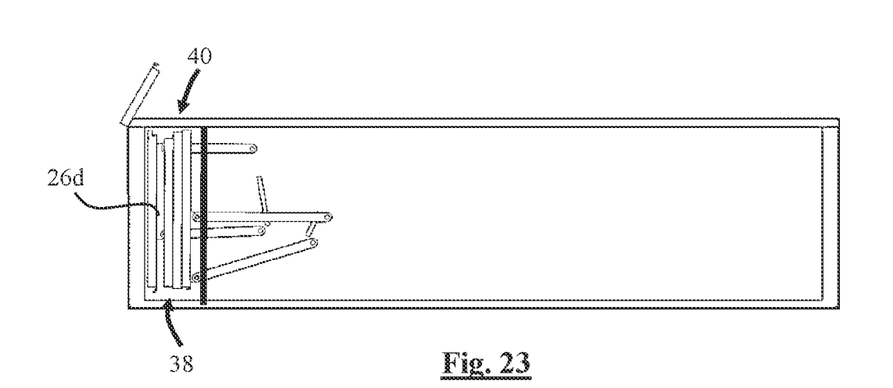
FIG. 23 is a side view of the tonneau cover.

In FIG. 11, the fifth panel 26e is moved or pivoted into an open position, thereby providing access into the storage compartment 38. The fifth panel 26e may be moved into this illustrated open position (compared to the illustrated closed position in the previous FIGS. 1-9) at any point in time, including before the first and second panels 26a, 26b are even moved (i.e., before FIG. 3). Alternatively, the fifth panel 26e may be moved into this illustrated open position after the stack 40 is formed and before the fourth panel 26d of the second panel group 32 is moved (i.e., while the fourth panel 26d is in its generally horizontal position along the horizontal plane).

FIGS. 12-17 illustrate movement of the fourth panel 26d into a stowed configuration in the storage compartment 38, while the stack 40 remains generally stationary. Movement of the fourth panel 26d into the stowed configuration in the storage compartment 38 may occur via the second mechanism 36. In the stowed configuration illustrated in FIG. 17, the fourth panel 26d is in a generally vertical position relative to plane H (FIG. 3), which may be generally perpendicular to the position of the fourth panel 26d when in the horizontal position (See FIG. 10, for example). However, in some configurations, the fourth panel 26d may be arranged at any angle relative to the plane H (FIG. 3) rather than being in a generally vertical position.

FIGS. 18-23 illustrate movement of the stack 40 into its stowed configuration in the storage compartment 38. Movement of the stack 40 into the stowed configuration in the storage compartment 38 may occur via the first mechanism 36. In the stowed configuration illustrated in FIG. 23, the stack 40 is in a generally vertical position, which may be generally perpendicular to the horizontal position when the stack 40 was in the horizontal position (See FIG. 10, for example). However, in some configurations, the stack 40 may be arranged at any angle relative to the plane H (FIG. 3) rather than being in a generally vertical position.

Figure 24:
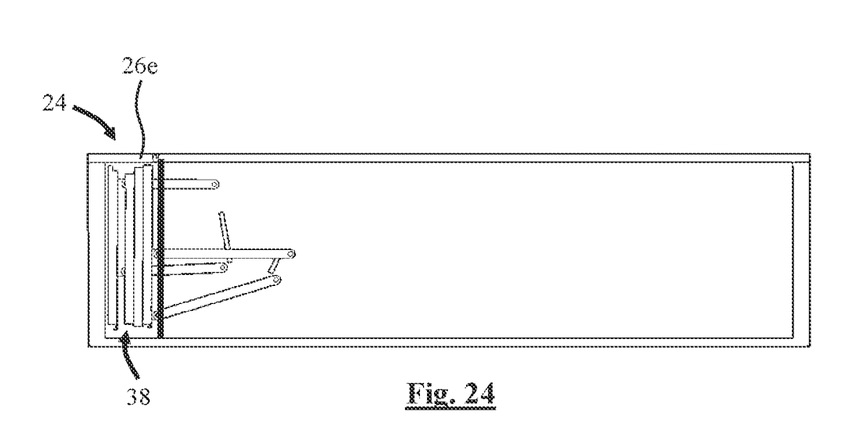
FIG. 24 is a side view of the tonneau cover.

FIG. 24 illustrates the fifth panel 26e moved into the closed position, thereby covering the storage are 38 with the tonneau cover 24 therein.

It is understood that any of the method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A tonneau cover for a vehicle comprising:
a first panel and a second panel, the first panel is arranged rearward of the second panel in vehicle position when the tonneau cover is in a closed position, each of the first panel and the second panel comprise a top surface and an opposing bottom surface;
a third panel and a fourth panel;
wherein the first panel and the second panel are movable onto the third panel into a stack where the top surface of the first panel is juxtaposed with the top surface of the second panel and the first panel is arranged in between the second panel and the third panel,
wherein the stack is connected to a first mechanism to assist with moving the stack into a storage compartment located at a forward region of the vehicle;
wherein the fourth panel is connected to a second mechanism to assist moving the fourth panel into the storage compartment; and wherein the fourth panel is moved into the storage compartment before the stack is moved into the storage compartment.

2. The tonneau cover according to claim 1, wherein while in the stack, the first panel and the second panel are in a generally horizontal orientation; and while in the storage compartment, the first panel and the second panel are in a generally vertical orientation.

3. The tonneau cover according to claim 2, wherein while in the stack, the top surface of the second panel is juxtaposed with the top surface of the third panel.

4. The tonneau cover according to claim 1, wherein the fourth panel is arranged generally vertically inside the storage compartment.

5. The tonneau cover according to claim 1, wherein the tonneau cover comprises a fifth panel that is arranged forward of the first panel, the second panel, the third panel, and the fourth panel, wherein the fifth panel is movable between an open and closed position, the fifth panel is arranged above the storage compartment.

6. A method of moving the tonneau cover according to claim 1 from the closed position to an open position, the method comprising: moving the first panel about a first hinge onto the second panel such that the top surface of the first panel is juxtaposed with the top surface of the second panel.

7. The method according to claim 6, wherein the method comprises a step of moving the first panel and the second panel on to the third panel, such that the first panel is located between the second panel and the third panel.

8. The method according to claim 6, wherein the method comprises changing an orientation of the stack and moving the stack into the storage compartment.

9. The method according to claim 8, wherein the stack is changed from a generally horizontal orientation to a generally vertical orientation.

10. The method according to claim 7, wherein the method comprises moving the fourth panel into the storage compartment and moving the stack into the storage compartment.

11. The method according to claim 10, wherein the method comprises moving the fourth panel into the storage compartment before moving the stack into the storage compartment.

12. The method according to claim 11, wherein the method comprises opening a storage panel to access an inside of the storage compartment.

13. A tonneau cover for a cargo area of a vehicle, the tonneau cover comprising:
a first panel and a second panel, the first panel is arranged rearward of the second panel in vehicle position when the tonneau cover is in a first position, each of the first panel and the second panel comprise a top surface and an opposing bottom surface,
wherein the first panel and the second panel are movable into a second position where the bottom surface of the first panel is juxtaposed with the bottom surface of the second panel,
wherein the first panel and the second panel are moveable into a storage compartment located at a forward region of the cargo area, and
wherein in both of the first position and the second position, the first panel and the second panel are in a generally horizontal orientation; and in the storage compartment, the first panel and the second panel are in a generally vertical orientation.

14. The tonneau cover according to claim 13, wherein the tonneau cover comprises a third panel, the second panel is arranged between the first panel and the third panel when the tonneau cover is in the first position, and
wherein in the second position, the second panel is arranged in between the first panel and the third panel.

15. The tonneau cover according to claim 14, wherein in the second position, the top surface of the second panel is arranged adjacent to a top surface of the third panel; and/or wherein the first position is a closed position of the tonneau cover; and/or wherein in the second position, the first panel is on top of the second panel.

16. The tonneau cover according to claim 13, wherein the tonneau cover comprises a third panel and a fourth panel;
wherein the tonneau cover is moveable into a stack, where the second panel is arranged in between the first panel and the third panel, and the stack is connected to a first mechanism to assist with moving the stack into the storage compartment;
wherein the fourth panel is connected to a second mechanism to assist moving the fourth panel into the storage compartment; and
wherein the fourth panel is moved into the storage compartment before the stack is moved into the storage compartment.

17. The tonneau cover according to claim 13, wherein the tonneau cover comprises a third panel and a fourth panel;
wherein the tonneau cover is moveable into a stack, where the second panel is arranged in between the first panel and the third panel, and the stack is connected to a first mechanism to assist with moving the stack into the storage compartment;
wherein the fourth panel is connected to a second mechanism to assist moving the fourth panel into the storage compartment.

18. The tonneau cover according to claim 17, wherein the fourth panel is moved into the storage compartment before the stack is moved into the storage compartment.

19. A tonneau cover for a vehicle comprising:
a first panel, a second panel, a third panel, and a fourth panel,
wherein the first panel, the second panel, and the third panel are movable into a stack,
wherein the stack is connected to a first mechanism to assist with moving the stack into a storage compartment located at a forward region of the vehicle;
wherein the fourth panel is connected to a second mechanism to assist moving the fourth panel into the storage compartment; and
wherein the fourth panel is moved into the storage compartment before the stack is moved into the storage compartment.

20. A tonneau cover for a vehicle comprising:
a first panel, a second panel, a third panel, and a fourth panel,
wherein the first panel, the second panel, and the third panel are movable into a stack, the stack is connected to a first mechanism to assist with moving the stack into a storage compartment,
wherein the fourth panel is connected to a second mechanism to assist with moving the fourth panel into the storage compartment before the stack is moved into the storage compartment.

* * * * *